United States Patent
Londergan et al.

(10) Patent No.: US 11,824,842 B2
(45) Date of Patent: Nov. 21, 2023

(54) COMPUTER METHOD FOR SECURE DISCLOSURE OF INFORMATION

(71) Applicant: ABAXX TECHNOLOGIES CORP.

(72) Inventors: Timothy M. Londergan, Seattle, WA (US); Carlos W. Korten, Natick, MA (US); Christopher A. Wiklof, Everett, WA (US)

(73) Assignee: ABAXX TECHNOLOGIES CORP., Christ Church (BB)

( * ) Notice: Subject to any disclaimer, the term of this patent is extended or adjusted under 35 U.S.C. 154(b) by 372 days.

(21) Appl. No.: 17/206,027

(22) Filed: Mar. 18, 2021

(65) Prior Publication Data

US 2021/0266299 A1    Aug. 26, 2021

Related U.S. Application Data

(63) Continuation-in-part of application No. PCT/US2019/048422, filed on Aug. 27, 2019.

(60) Provisional application No. 62/733,065, filed on Sep. 18, 2018.

(51) Int. Cl.
*H04L 9/40* (2022.01)
*G06F 16/28* (2019.01)

(52) U.S. Cl.
CPC .......... *H04L 63/0428* (2013.01); *G06F 16/28* (2019.01)

(58) Field of Classification Search
CPC .............................. H04L 63/0428; G06F 16/28
USPC ........................................................ 713/193
See application file for complete search history.

(56) References Cited

U.S. PATENT DOCUMENTS

| | | | | |
|---|---|---|---|---|
| 9,608,829 | B2* | 3/2017 | Spanos | H04L 9/3268 |
| 9,727,748 | B1* | 8/2017 | Yaeger | G06F 21/6218 |
| 10,805,072 | B2* | 10/2020 | Corduan | H04L 9/085 |
| 10,831,918 | B2* | 11/2020 | Roberts | G06F 16/2379 |
| 2005/0050344 | A1* | 3/2005 | Hull | H04L 65/762 |
| | | | | 713/193 |
| 2016/0283920 | A1* | 9/2016 | Fisher | G06Q 20/065 |
| 2017/0046526 | A1 | 2/2017 | Chan et al. | |
| 2017/0070778 | A1 | 3/2017 | Zerlan | |
| 2018/0006831 | A1* | 1/2018 | Toll | G06Q 40/04 |
| 2018/0204213 | A1* | 7/2018 | Zappier | H04L 9/3239 |
| 2018/0337904 | A1* | 11/2018 | Letourneau | H04L 63/065 |
| 2019/0207912 | A1* | 7/2019 | Nielson | H04L 9/3239 |
| 2019/0363884 | A1* | 11/2019 | Johnson | H04L 63/123 |
| 2019/0392432 | A1* | 12/2019 | Keskar | H04L 63/0428 |
| 2020/0143337 | A1* | 5/2020 | Conroy | G06Q 40/12 |
| 2021/0328777 | A1* | 10/2021 | Brooks | H04L 9/3297 |

(Continued)

OTHER PUBLICATIONS

Written Opinion, dated Dec. 5, 2022, issued in corresponding Singapore Application No. 11202101705Q, 5 pps.

(Continued)

*Primary Examiner* — Dant B Shaifer Harriman
(74) *Attorney, Agent, or Firm* — Panitch Schwarze Belisario & Nadel LLP (57) ABSTRACT

A system provides an immutable record of human creative output as one or more secure disclosure threads. The immutable record may be stored on a blockchain. Addresses to the data corresponding to the one or more secure disclosure threads may be encrypted and stored on a blockchain. The immutable record and the addresses to the data may be stored on the same blockchain. The immutable record and the addresses to the data may be stored on different blockchains.

26 Claims, 10 Drawing Sheets

(56) References Cited

U.S. PATENT DOCUMENTS

2022/0100874 A1* 3/2022 Singh .................. G06F 21/6218
2022/0141014 A1* 5/2022 Britto ....................... H04L 9/32
                                                            380/286
2022/0350914 A1* 11/2022 Moore ................ G06F 21/6218

OTHER PUBLICATIONS

PCT International Search Report and Written Opinion for International Application No. PCT/US2019/048422 dated Dec. 17, 2019, 9 pgs.
PCT International Preliminary Report on Patentability for International Application No. PCT/US2019/048422 dated Apr. 1, 2021, 5 pgs.

* cited by examiner

ADD NEW SECURE DISCLOSURE [X]

TITLE
REVERSE POLARITY IN LITHIUM BATTERY

DRAG ONE OR MORE FILES WITH AN IMAGE, SOUND, VIDEO, OR PDF FILE

LOGO  ABC.JPG IMAGE, 128 MB  [X] — 208

🔊  ABC.MP3 SOUND, 128 MB  [X] — 208

ABSTRACT

HYPOTHETICAL IMPACT OF APPLYING REVERSE POLARITY TECHNIQUES WHICH HAVE BEEN IN NICKEL PLATING TO IMPROVE MANUFACTURING THROUGHPUT IN LITHIUM BATTERY ODUCTION.

123 / 300 CHARATERS

KEYWORDS

[#BETTERENERGY X] [CARPROJECT X]

BROWSE FILES ______________________ [ADD]

[SUBMIT TO BLOCKCHAIN] — 212

SHARED TO YOU BY WILLIAM JONES ~ 602

GPS MOUNT FOR ELECTRIC CAR ENGINE
                                              604
VAULT DATE: FEB. 2, 2016 23:21:23:1234555 ~ 606
DIGITAL SIGNATURE: JOHN A. SMITH ~ 608

HI STEVE, I CAME UP WITH A NEW APPROACH TO THE PROBLEM WE
DISCUSSED AT THE GENEVA SEMINARS, USING A TECHNIQUE THAT I'VE BEEN ~ 610
TESTING FOR COPPER PLATING. WOULD APPRECIATE YOUR THOUGHTS ON
COMMERCIAL VIABILITY.

☑ I ACKNOWLEDGE THAT THIS IS A CONFIDENTIAL DISCLOSURE AND THAT I AM
BOUND BY <u>THESE NDA TERMS</u>

612

VIEW SECURE DISCLOSURE ~ 614

COMPUTER METHOD FOR SECURE DISCLOSURE OF INFORMATION

SUMMARY

According to an embodiment, a computer method for providing an immutable record of human creativity includes displaying a graphical user interface (GUI) to a user including a directory screen, the directory screen displaying one or more selection objects each configured for accessing a respective corresponding secure disclosure thread. The computer method includes receiving a user-input selection of one of the selection objects and receiving a cryptographic key. The computer method includes decrypting, using the cryptographic key, at least a portion of the secure disclosure thread corresponding to the selected one of the selection objects, and displaying the portion of the secure disclosure thread on the graphical user interface.

According to embodiments, a computer method includes receiving a securely stored disclosure. The method includes receiving, into a server computer from a first user via a graphical user interface (GUI) displayed on an electronic display of a first user computing device, a computer data file carrying a representation of a human creative product of the first user. The first user may have a first user account. The method further includes receiving, from the first user via one or more entry fields of the GUI or via actuation of icons of the GUI, one or more character strings constituting metadata related to the human creative product. The method also includes encrypting the computer data file and storing the encrypted computer data file in a high capacity storage service at an addressable storage location. The addressable storage location is encrypted to form an encrypted storage location and is recorded in a low or medium capacity data storage structure. The method further includes writing, in a database, a database record associated with the first user account, the database record including an addressable portion of the low or medium capacity data storage structure. The database may be stored locally to the server computer, such as in in a RAID array, or may be stored in one or more remote resources, such as in cloud storage. The database may include a conventional database such as a SQL variant, or in another service such as MongoDB. The method also includes outputting to the GUI an indication carrying information associated with the first user account, the indication corresponding to the stored computer data file representing the human creative product.

According to an embodiment, a computer method includes receiving, from a user via a graphical user interface, metadata related to a disclosure, recording the received disclosure in an encrypted high capacity data storage structure, and logging the recording in an access history to an encrypted medium capacity data storage structure different from the high capacity data storage structure. The computer method may further include transmitting access information to a second user for retrieving some or all of the disclosure, receiving a request for the secure and/or secret disclosure, transmitting corresponding data for decryption using a "Public" decryption key provided to the second user, and logging the transmission in the access history to the encrypted medium capacity data storage structure. The metadata may be written to a third data storage structure. Further disclosures by the user and/or the second user may similarly be securely recorded. The computer method may include displaying a directory screen showing the existence and linking to the encrypted disclosure. The high capacity data storage structure may include a blockchain carried by non-transitory computer readable media distributed across a plurality of devices. The medium capacity data storage structure may include a blockchain carried by non-transitory computer readable media distributed across a plurality of devices. The third data storage structure may include a blockchain carried by non-transitory computer readable media distributed across a plurality of devices.

DETAILED DESCRIPTION

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

Figure 1:
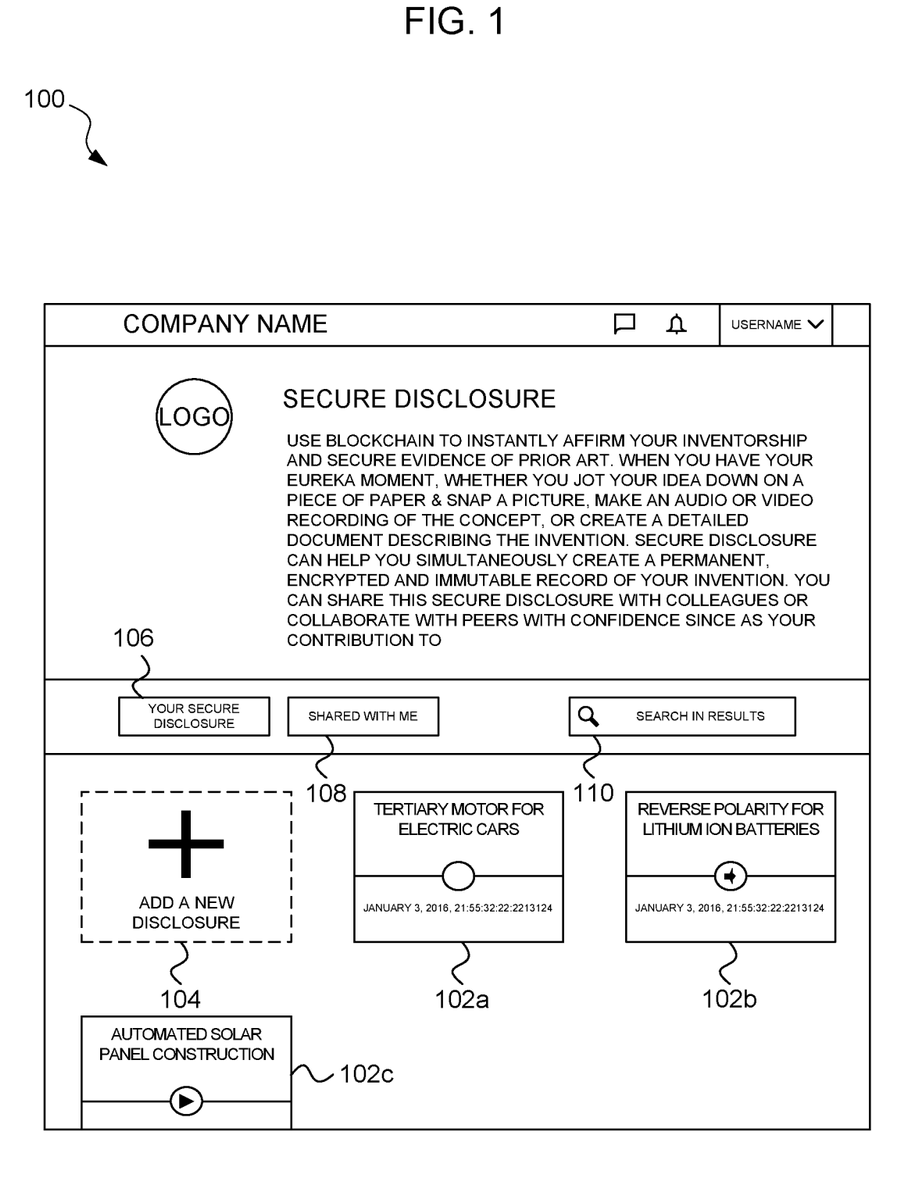
FIG. 1 is a simulated graphical user interface screen showing a secure disclosure directory, according to an embodiment.

FIG. 1 is a simulated graphical user interface screen 100 showing a secure disclosure directory, according to an embodiment. The secure disclosure directory screen 100 includes one or more selection objects 102a, 102b, 102c corresponding to current secure disclosure threads. The term "disclosure thread", as used herein, may refer to an electronic record containing or configured to receive disclosure of a creative effort. Disclosure may include textual, graphic, video, audio and/or other information including detail, examples, history, and/or background related thereto, etc., all related to a result of human creativity. Non-limiting examples may include details of an invention, trade secret, process, formula, or the like. The secure disclosure directory screen 100 may additionally or alternatively display past (e.g., closed) secure disclosure threads. A user may initiate a process to review and/or add new material to a current secure disclosure thread by graphically actuating its corresponding object. The secure disclosure directory screen 100 may also include an Add New Disclosure object 104. The user may initiate a process to start a new secure disclosure thread by graphically actuating the Add New Disclosure object 104.

A Your Secure Disclosure object 106 may be provided to select the secure disclosure directory screen 100 view that includes the current secure disclosure thread objects 102a, 102b, 102c that were initiated by the user.

The secure disclosure directory screen 100 selected by the Your Secure Disclosure object 106 may include a partial or complete history of the user's prior secure disclosures. The selection objects 102a, 102b, 102c enable the user to access and view previous disclosure objects or previous disclosure objects or disclosure threads.

The simulated graphical user interface screen 100 is part of a secure disclosure system that utilizes blockchain to enable users to instantly affirm inventorship and secure evidence of prior art. When the user has an inventive or creative moment, whether the user jots the idea down on a piece of paper and snaps a picture, makes an audio or video recording of the concept, or creates a detailed document describing the invention, the secure disclosure system can help the user to simultaneously create a permanent, encrypted and immutable record of the invention or creation. Users can share the secure disclosure with colleagues or collaborate with peers with confidence because the user's contribution to the art is immutably recorded.

A Shared With Me object 108 may similarly select a secure disclosure directory screen 100 that includes current selection objects (e.g., 102a, 102b, 102c) corresponding to disclosure threads shared with the user by one or more second users.

According to an embodiment, selecting the Add New Disclosure object 104 enables the user to initiate a process to start a new disclosure thread.

Figure 2:
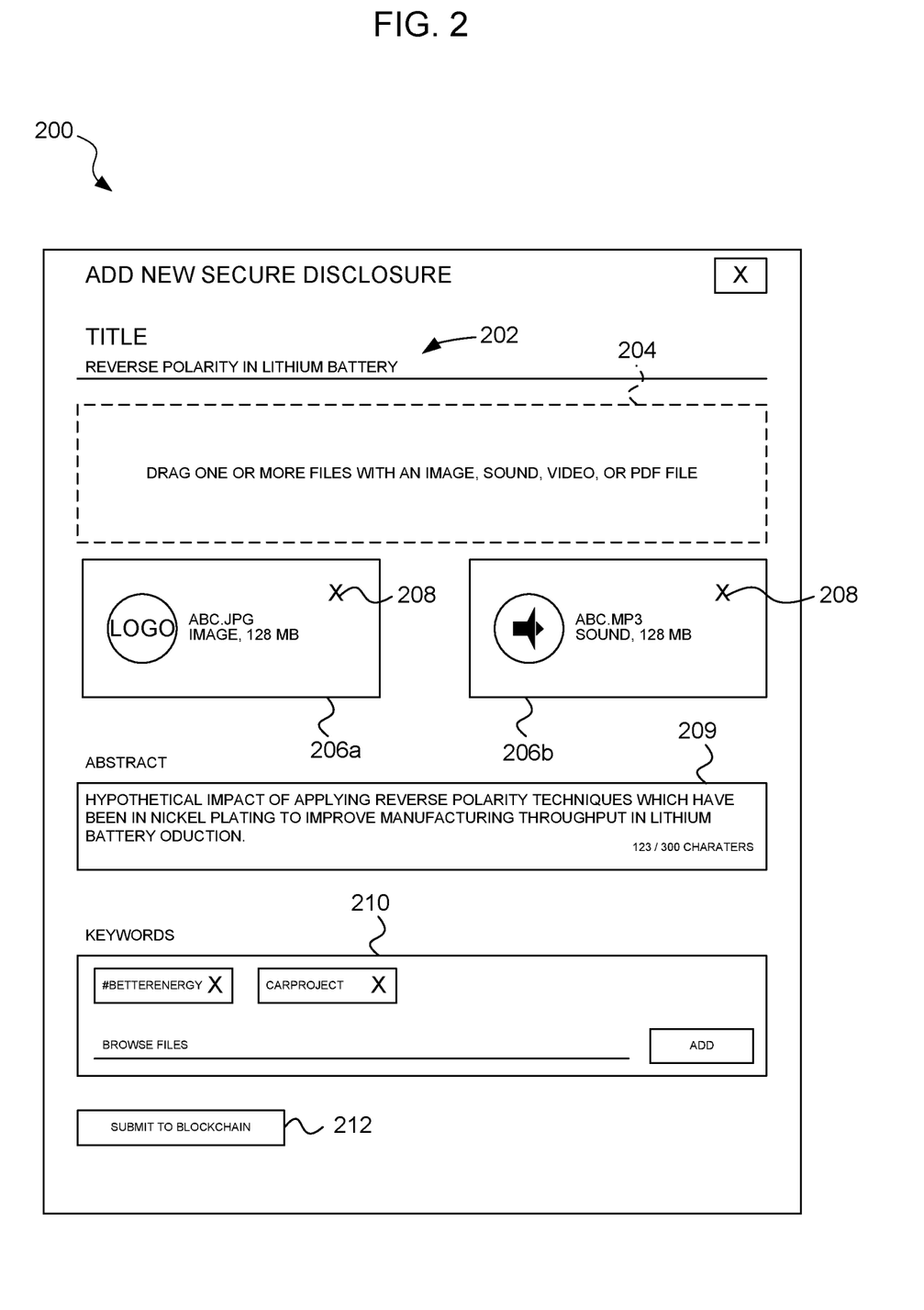
FIG. 2 is a simulated graphical user interface screen from which a new disclosure or disclosure thread can be added, according to an embodiment.

FIG. 2 is a simulated graphical user interface screen 200 from which a new disclosure or disclosure thread can be added, according to an embodiment. The screen 200 can be accessed by selecting the Add New Disclosure object 104 from the secure disclosure directory screen 100 shown in FIG. 1.

According to an embodiment, the screen 200 includes a Title field 202. The user can select the title field 202 in order to add a title for the new disclosure. The user can type or paste a title into the title field 202.

According to an embodiment, the screen 200 includes an Add Media object 204. The Add Media object 204 enables the user to add one or more media files to the new disclosure. The user can add a media file to the new disclosure by dragging a media file onto the Add Media object 204. Additionally or alternatively, the user can select the Add Media object 204 in the screen 200 that can provide a file browsing option to enable the user to browse a file system in order to add media files to the new disclosure.

According to an embodiment, the media files can include one or more of an image file, an audio file, a video file, a text file, a document file, a PDF file, or other types of media. When a user has a new creative idea, the user can make an audio recording, video recording, capture an image, make a drawing, or produce a document proving conception of the creative idea. The user can then upload the one or more media files to the add new disclosure screen 200. In this way, the user can secure proof of conception of the creative idea. According to an embodiment, the media files are encrypted as a privileged asset. According to an embodiment, the media files are immutable and time stamped.

According to an embodiment, the screen 200 can include Added Media Indicator objects 206a, 206b. The Added Media Indicator objects 206a, 206b represent media files that have already been added to the new disclosure. The Added Media Indicator objects 206a, 206b can include a deletion object 208 that enables the user to delete the media from the new disclosure by selecting the deletion object 208.

According to an embodiment, the screen 200 includes an Abstract field 209. The user can select the Abstract field 209 in order to provide an abstract for the new disclosure. The abstract can include a brief overview or description of the content of the new disclosure.

According to an embodiment, the screen 200 includes a Keywords field 210. The Keywords field 210 can enable the user to add keywords to the new disclosure as hashtags, metadata, or other kinds of labels. The keywords that have been added to the new disclosure can be utilized for search indexing.

According to an embodiment, the Keywords field 210 can display keywords that have already been added, as well as an object to delete those keywords that have already been added.

According to an embodiment, the screen 200 can include a Submit to Blockchain object 212. The Submit to Blockchain object 212 can enable the user to submit the new disclosure to the blockchain. Submitting the disclosure to the blockchain creates an immutable record of the new disclosure, according to an embodiment.

Figure 3:
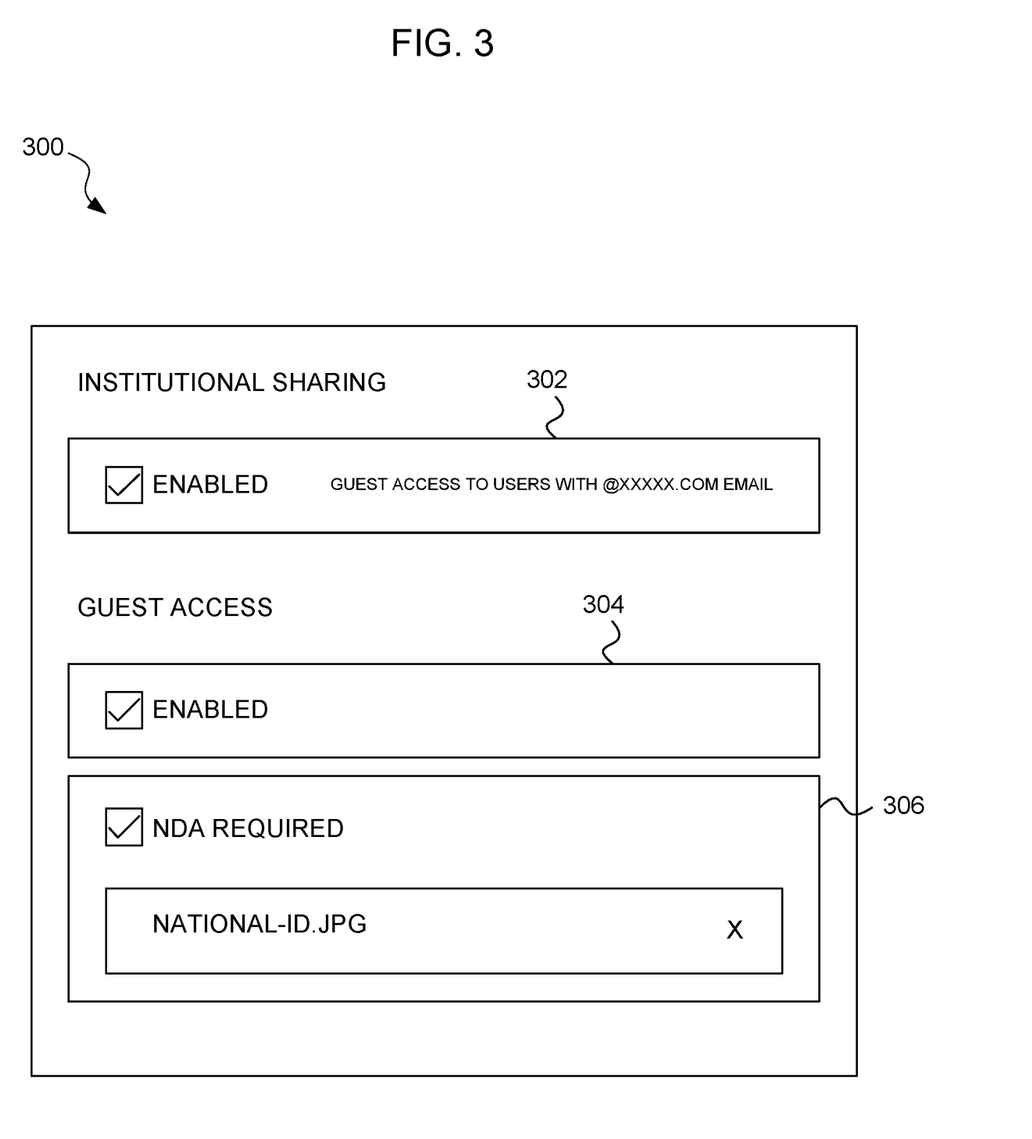
FIG. 3 is a simulated graphical user interface screen that enables sharing settings to be configured, according to an embodiment.

FIG. 3 is a simulated graphical user interface screen 300 that enables sharing settings to be configured, according to an embodiment. By selecting among the various options shown on the screen 300, the user can define who may access disclosures that have been added to the system.

According to an embodiment, the screen 300 includes an Institutional Sharing field 302. The Institutional Sharing field 302 enables the user to select whether or not guest access will be granted to users within an organization or an institution selected by the user. The Institutional Sharing field 302 enables the user to enter email domains defining users that will be granted guest access. The user can enable or disable institutional sharing from the Institutional Sharing field 302. According to an embodiment, the Institutional Sharing field 302 grants read-only access to other people within the selected institution or organization. According to an embodiment, the selected institution or organization is a company, a business, an organization, or an institution to which the user belongs.

According to an embodiment, the screen 300 includes a Guest Access Enablement field 304. The Guest Access Enablement field 304 enables the user to select whether or not guest access will be allowed.

According to an embodiment, the screen 300 includes a Non-Disclosure Agreement (NDA) Requirement field 306. The NDA Requirement field 306 enables the user to select whether or not those who are granted guest access will be required to agree to an NDA before being allowed to view the disclosure thread.

According to an embodiment, the NDA Requirement field 306 can enable the user to use a default NDA or a custom NDA. If the user selects a custom NDA, then the user can upload the custom NDA to the system.

Figure 4:
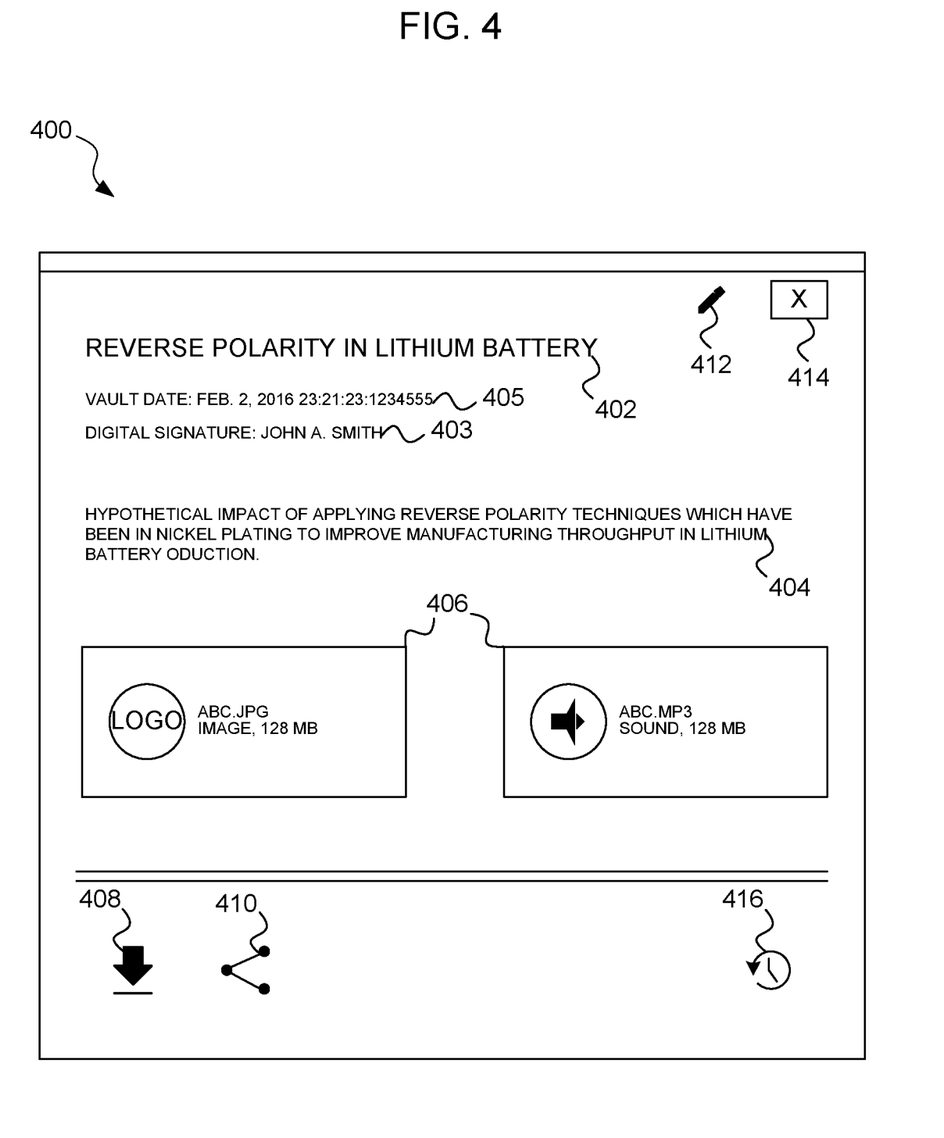
FIG. 4 is a simulated graphical user interface screen including a disclosure thread that has been added by the user, according to an embodiment.

FIG. 4 is a simulated graphical user interface screen 400 including a disclosure thread that has been added by the user, according to an embodiment. The disclosure thread as shown on the screen 400 includes a title 402, a digital signature of the owner 403, a vault date 405, an abstract 404, media attachments 406, a Download object 408, a Share object 410, an Edit Disclosure object 412, a Delete object 414, and a View Access History object 416, according to an embodiment.

According to an embodiment, the screen 400 includes public-editable attributes. The public-editable attributes can include the title 402 and the abstract 404. In an embodiment, a public-editable attribute may include a sharing configuration. The public-editable attributes are attributes that can be edited by the public, according to an embodiment.

According to an embodiment, the screen 400 includes immutable attributes. The immutable attributes can include the media attachments 406, the vault date 405, and the digital signature of the owner 403. The immutable attributes cannot be edited by the public.

According to an embodiment, the user can download the disclosure thread via the Download object 408. According to an embodiment, the user can share the disclosure thread by selecting the Share object 410. According to an embodiment, the user can edit the attributes of the disclosure thread by selecting the Edit Disclosure object 412. According to an embodiment, the user can delete the disclosure thread by selecting the Delete object 414. According to an embodiment, the user can view the access history by selecting the View Access History object 416. The access history indicates who has viewed the disclosure thread, and the date and the time when the disclosure thread was accessed.

Figure 5:
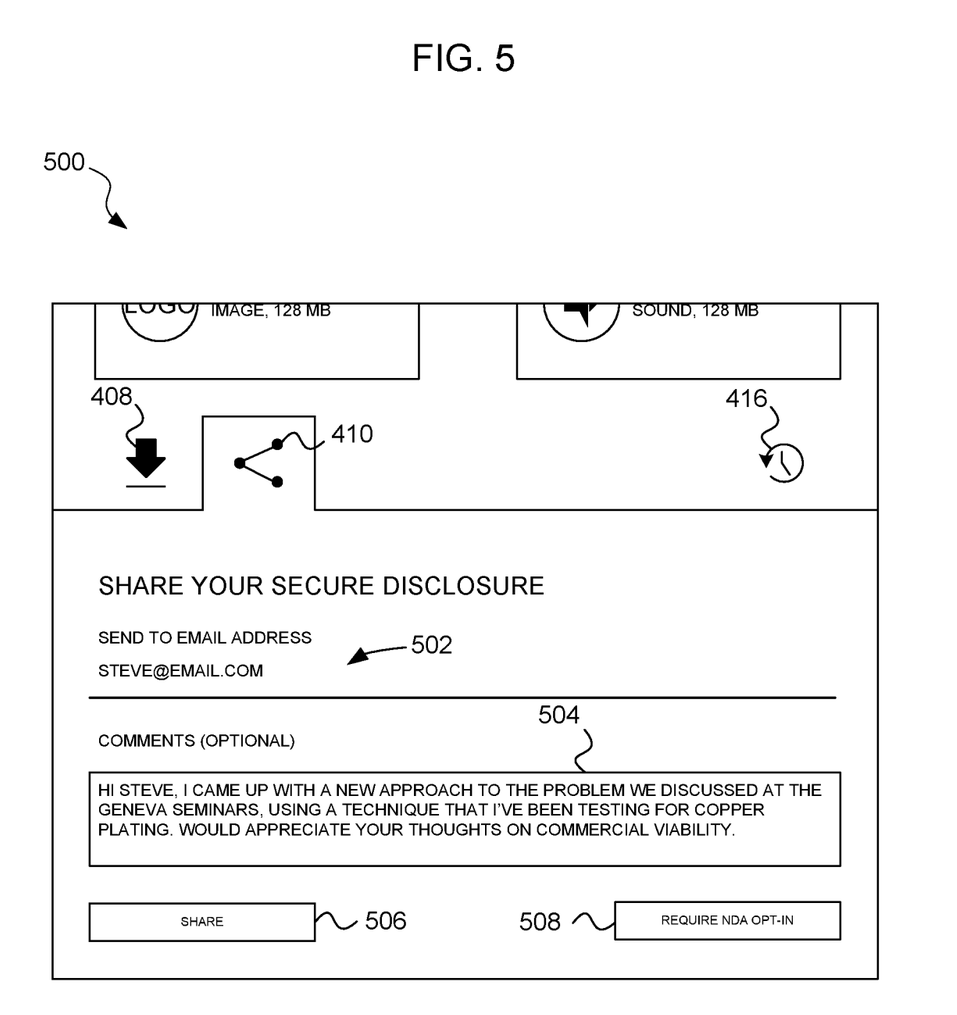
FIG. 5 is a simulated graphical user interface screen enabling a user to share access to the disclosure thread, according to an embodiment.

FIG. 5 is a simulated graphical user interface screen 500 enabling the user to share access to the disclosure thread, according to an embodiment. The screen 500 can be accessed by selecting the Share object 410 from the screen 400, according to an embodiment.

According to an embodiment, the screen 500 includes an address field 502. The address field 502 enables the user to select an email address or other type of address for a guest with whom access to the disclosure thread will be shared.

According to an embodiment, the screen 500 includes a Comments field 504. The Comments field 504 enables the user to enter a message that will be provided to the guest with whom the disclosure thread will be shared.

According to an embodiment, the screen 500 can include a Share object 506. The Share object 506 enables the user to finally share the disclosure thread with another individual.

According to an embodiment, the screen 500 can include an NDA Opt-In object 508. The NDA Opt-In object 508 can enable the user to require that the guest agree to an NDA before being granted access to the disclosure thread.

According to an embodiment, the screen 500 enables an audited invitation to be sent to a third party to view the disclosure thread.

Figure 6:
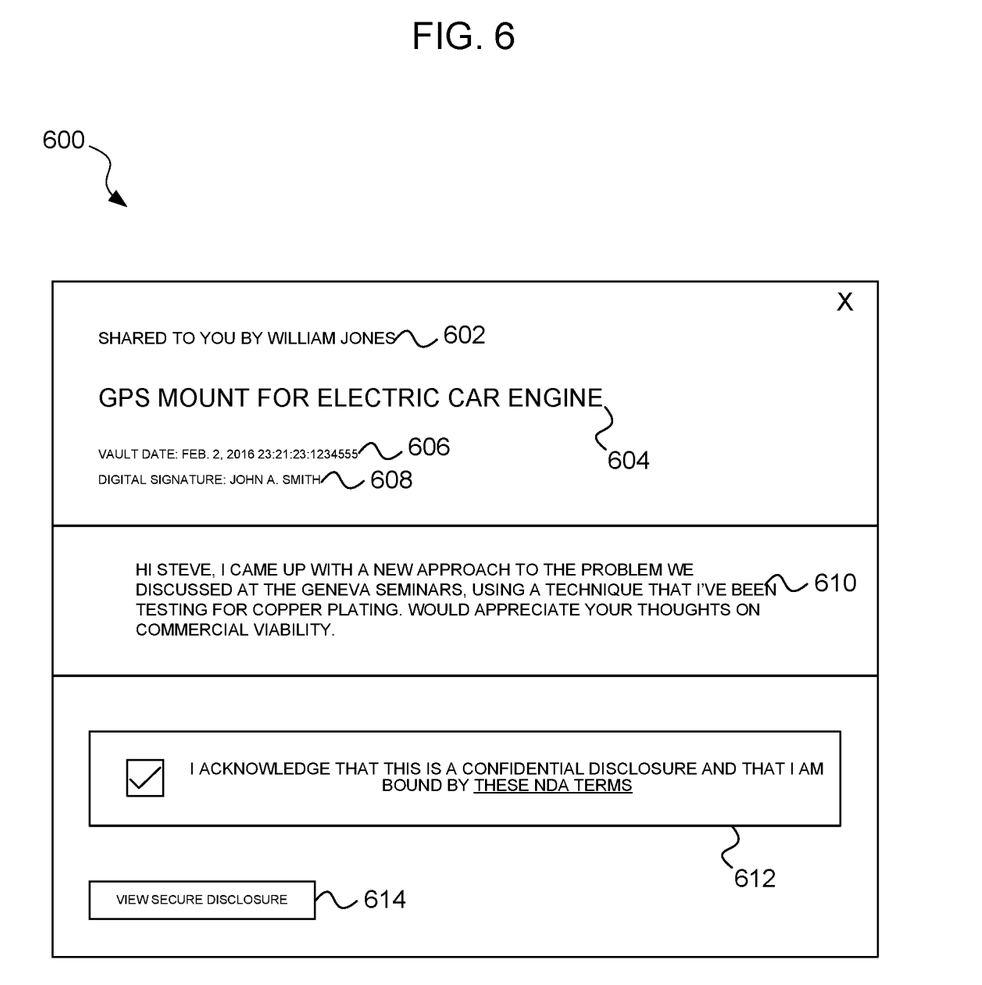
FIG. 6 is a simulated graphical user interface screen corresponding to a guest invitation message for granting access to view a disclosure thread, according to an embodiment.

FIG. 6 is a simulated graphical user interface screen 600 corresponding to a guest invitation message granting access to view a disclosure thread, according to an embodiment. The guest invitation message can be received by the guest as a result of the owner of a disclosure thread selecting the share object 506 after filling in the contents of the screen 500.

According to an embodiment, the screen 600 includes a sender identification 602. The sender identification 602 indicates the identity of the individual sending the guest invitation message.

According to an embodiment, the screen 600 includes a title 604 of the disclosure thread being shared.

According to an embodiment, the screen 600 includes a vault date 606 and a digital signature 608 of the owner of the disclosure thread.

According to an embodiment, the screen 600 includes message text 610. The message text 610 corresponds to the message provided by the sender to the guest.

According to an embodiment, the screen 600 includes an NDA Opt-In object 612. According to an embodiment, the guest cannot access the disclosure thread until the guest has agreed to the terms of the NDA.

According to an embodiment, the screen 600 includes a view secure disclosure object 614. After the guest has agreed to the terms of the NDA, the guest can select the view secure disclosure object 614.

Figure 7:
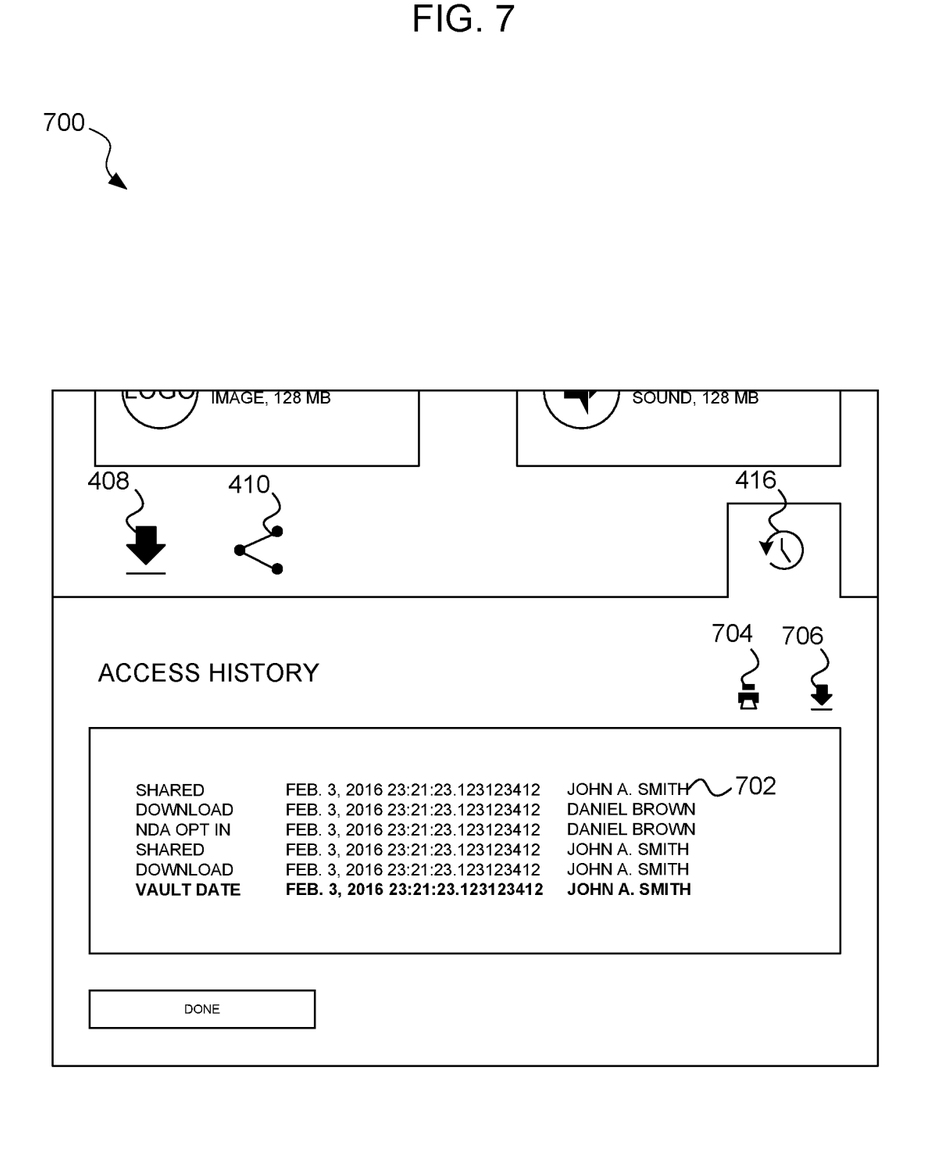
FIG. 7 is a simulated graphical user interface screen showing an access history of a disclosure thread, according to an embodiment.

FIG. 7 is a simulated graphical user interface screen 700 showing an access history of a disclosure thread, according to an embodiment. The screen 700 can be accessed by selecting the View Access History object 416 from the screen 400 of FIG. 4.

According to an embodiment, the screen 700 includes an access history 702. The access history 702 is a secure and immutable audit record across all users that have accessed the disclosure thread in any way. The access history 702 can include the date and the time of the vault date of the disclosure thread, i.e., the date and time the disclosure thread was created, as well as the name of the user responsible for the vault date. The access history 702 can include the date and the time of each instance in which the disclosure thread was downloaded, as well as the identities of the individuals who downloaded the disclosure thread. The access history 702 can include the date and the time of each instance that the disclosure document was shared, as well as the identity of the individual that shared the disclosure thread. Although the dates shown in the access history 702 in the illustrative embodiment of FIG. 7 are identical, in practice the access dates would correspond to actual dates and times of access that may be spread across many different times and/or dates. The access history 702 can also indicate the date and the time that an individual accepted the terms of an NDA for viewing the disclosure thread, as well as the identity of the individual that accepted the terms of the NDA.

According to an embodiment, the screen 700 includes an access history printing object 704. The access history printing object 704 enables the user to print the access history 702.

According to an embodiment, the screen 700 includes an Access History Download object 706. The Access History Download object 706 enables the user to download the access history 702.

Figure 8:
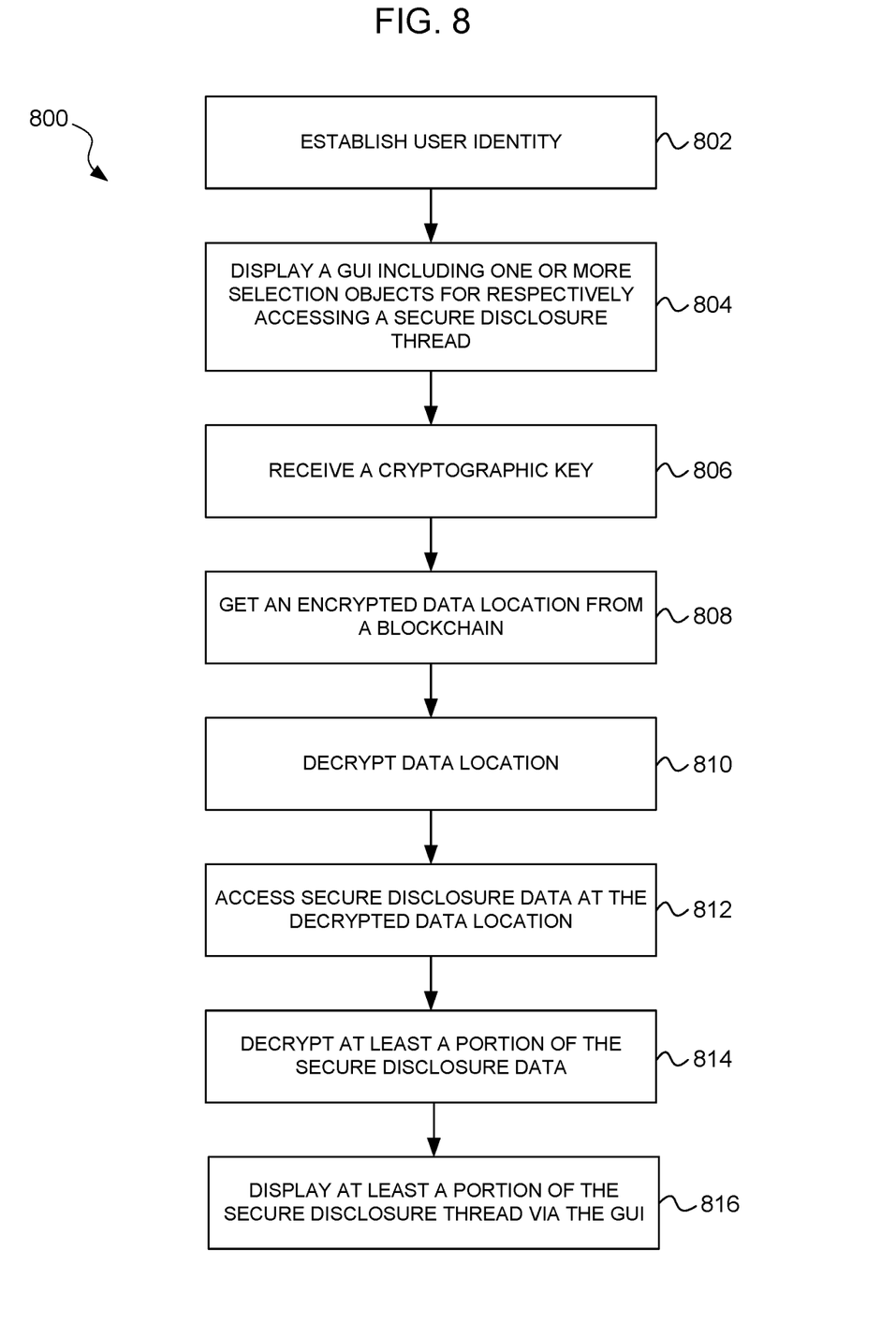
FIG. 8 is a flowchart illustrating a computer method for providing an immutable record of human creative output, according to an embodiment.

FIG. 8 is a flowchart illustrating a computer method 800 for providing an immutable record of human creative output, according to an embodiment. At step 802, a user identity is determined. This may be done using a conventional user account and a password and/or two-factor authentication, for example. Proceeding to step 804, a graphical user interface (GUI) is displayed to the user. The GUI may include a directory screen (see, e.g., FIG. 1), the directory screen displaying one or more selection objects (e.g., 102*a*, 102*b*, 102*c*) each configured for accessing a respective corresponding secure disclosure thread. Step 804 includes receiving a user-input selection of one of the selection objects. Step 806 includes receiving a cryptographic key. Step 806 may include receiving a cryptographic key from the user via the GUI. In another embodiment, step 806 may include receiving the cryptographic key (e.g., a "private key", a "public key", or a "symmetrical key") from a keystore that is associated with the user account. In some embodiments, the user may be required to provide authentication for accessing the keystore. The keystore may be provided by a medium capacity blockchain. According to an embodiment, receiving the cryptographic key, in step 806, may include reading the cryptographic key held in custody and associated with a user account by a server application performing a plurality of steps (e.g., one or more of at least 802-816) of the computer method 800.

Step 808 includes obtaining an encrypted data location corresponding to the secure disclosure thread from a blockchain. In step 810, the location of the encrypted data is decrypted. According to an embodiment, decrypting the location uses the cryptographic key. In step 812, data corresponding to the secure disclosure thread is accessed at the data location. In an embodiment, obtaining an encrypted data location corresponding to the secure disclosure thread from a blockchain includes retrieving the encrypted data location from a medium capacity blockchain. The medium capacity blockchain may include Ethereum. In an embodiment, the data location is addressed as an address in a high capacity blockchain or distributed storage system. The high capacity blockchain may include BigChainDB or Avalanche, for example. In an embodiment, the data location may be a multi-hash in a distributed file system. The distributed file system may be or include an InterPlanetary File System (IPFS). The IPFS storage may be addressed via FileCoin.

Proceeding to step 814, at least a portion of the secure disclosure thread corresponding to the selected one of the selection objects is decrypted using the received cryptographic key. In step 816, the portion of the secure disclosure thread is displayed to the user via the graphical user interface.

Referring to step 804, in an embodiment, displaying the GUI to the user includes displaying a selection object, of the one or more selection objects, for accessing a respective corresponding secure disclosure thread that is established by the user. In another embodiment, displaying the GUI to the user includes displaying a selection object, of the one or more selection objects, for accessing a respective corresponding secure disclosure thread that is shared with the user by a second user.

Figure 9:
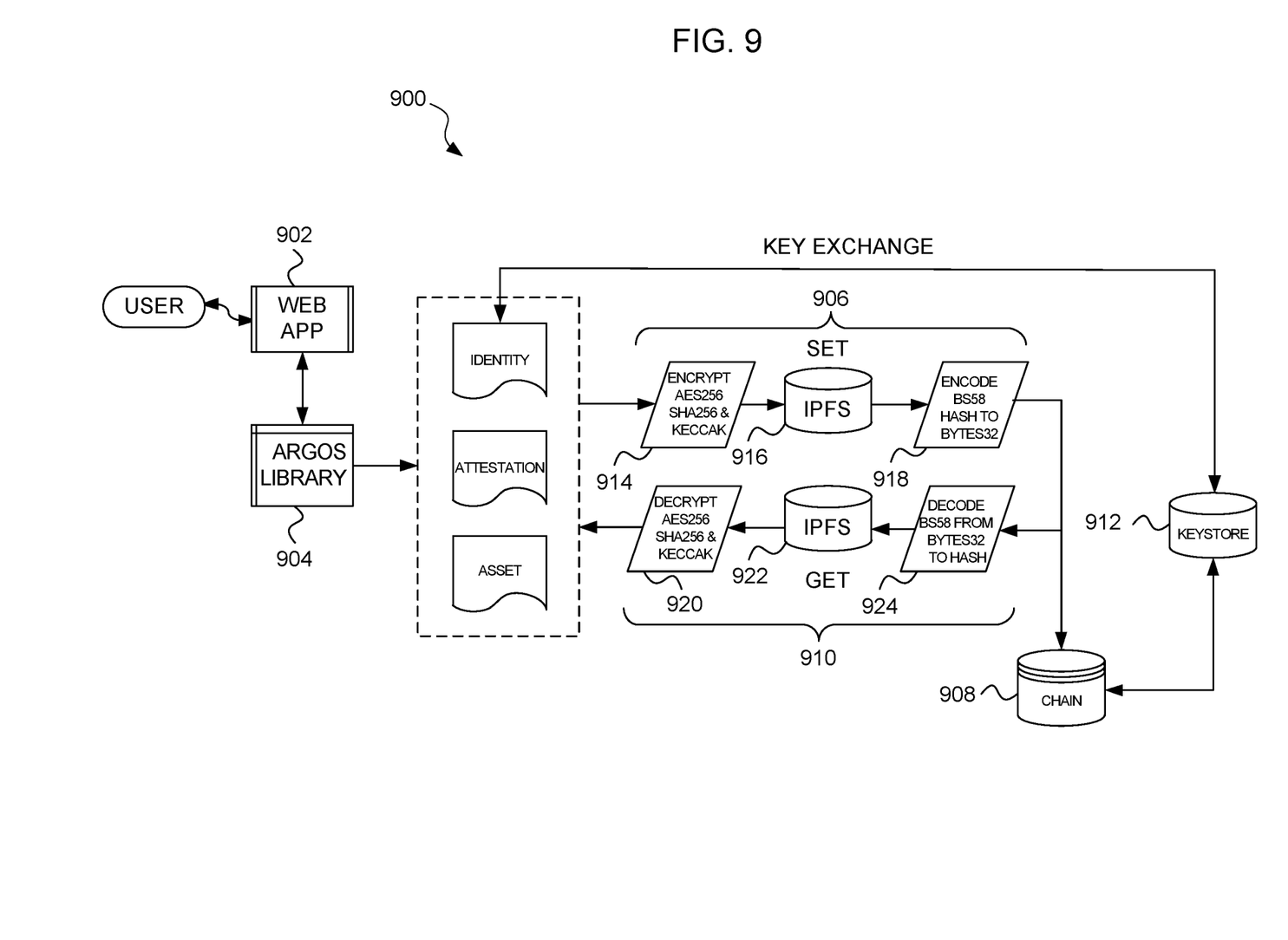
FIG. 9 is a system diagram illustrating how a secure disclosure thread is encrypted and decrypted, according to an embodiment.

FIG. 9 is a system 900 diagram illustrating a non-limiting embodiment for how a secure disclosure thread is encrypted and decrypted, according to an embodiment.

Data is encrypted and stored in a hash tree, e.g., a Merkle tree, using IPFS and the reference to the data is hashed on the blockchain. A base58 network encoding library for the platform is located on a GITHUB repository which is used inside a command library 904, identified as "Argos" in FIG. 9. The command library 904 includes conversions from a selected high level language, such as Javascript, Python, or C#, etc., to low level commands supported by a blockchain. To add new secure disclosure materials to the secure disclosure thread, "some data" is sent from the web application 902 to the command library 904.

The command library 904 encrypts and stores the data then hashes a data reference, shown as process 906, and sends it to the medium capacity blockchain 908.
For example:

"some data"→encrypt(aes256ctr)→store data in Merkle tree dag→sha.keccak256 hash the store id→bytes32→chain
Result on Blockchain:
{
"store":
"0xbdc80a0ecb83f95c438027c88abc2aad696c55602f77e4cef9d5f888df77f0588"
"active": 1
}
To read a secure disclosure thread, the storing process is reversed in the command library 904, shown as process 910, to retrieve the data from the medium capacity blockchain 908. The retrieved data provides one or more pointers to encrypted storage locations, from which data is retrieved to the web application 902 as requested by the user.

The medium capacity blockchain 908 has a built-in keystore 912 which stores all the keys for accounts, assets and attestations. When a call is made by an individual, the identity key exchange, in order to transact, is made as:

publicKey→keystore→privateKey→chain

In other words, private keys may be held in trust by the medium capacity blockchain 908 provider, such as Ethereum.

Referring to the process 906, to encrypt a Secure Disclosure, the Secure Disclosure is packaged and encrypted using protocols 914. The encrypted Secure Disclosure is stored in an IPFS Merkle Tree 916, and the address of the encrypted Secure Disclosure is (itself) encrypted in 918, and then stored on the medium capacity blockchain 908.

According to an embodiment, the address of the encrypted Secure Disclosure, under IPFS, is a hash result of its content. If a would-be hacker were to change a single bit in the original Secure Disclosure, the IPFS address would change and it would mismatch to the encrypted value stored on the blockchain. This would be evidence of tampering. Another way to think of it is that the immutable IPFS address stored on the medium capacity blockchain 908 points to a unique spot in the cloud (e.g., in a high capacity blockchain or distributed file system) that mathematically can only contain the original unaltered encrypted version of the Secure Disclosure.

Referring to the process 910, to access a Secure Disclosure, the medium capacity blockchain 908 is accessed to obtain the encrypted address of the encrypted secure disclosure. The address is decrypted in 920 and the decrypted address obtains data from a storage asset (e.g., a high capacity blockchain) and is output to an IPFS Merkle Tree 922. The IPFS Merkle Tree 922 is unpacked and decrypted, in 924, using protocols.

The private keys may be held in trust by the blockchain provider (e.g., Ethereum) as a service to its clients, according to embodiments. Additionally or alternatively, one or more private keys may be entered by the user using the GUI of the web application 902.

Figure 10:
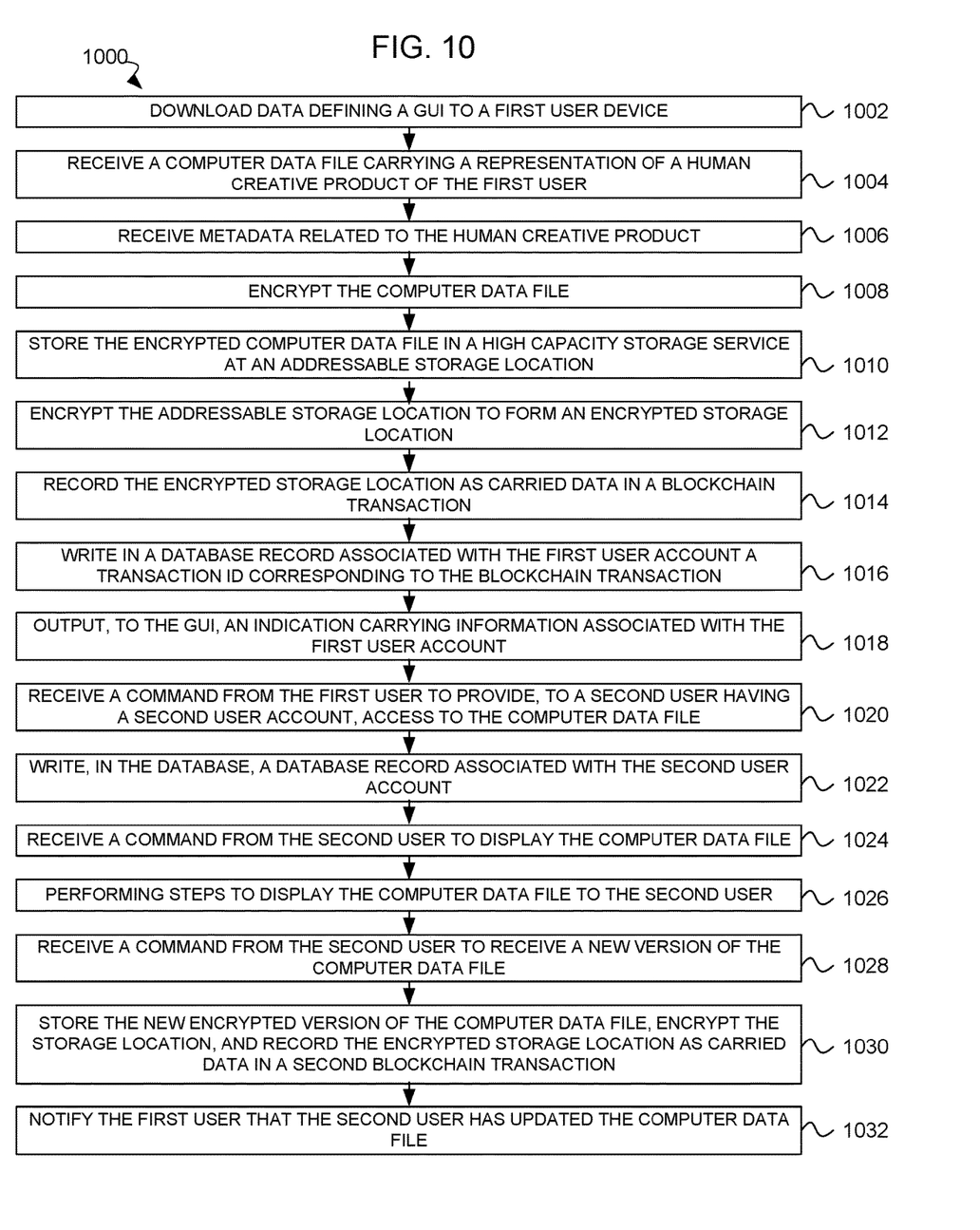
FIG. 10 is a flowchart illustrating a computer method for establishing a securely stored disclosure, according to an embodiment.

FIG. 10 is a flowchart illustrating a computer method 1000 for establishing a securely stored disclosure, according to an embodiment. The computer method 1000 may include, in operation 1002, downloading data defining a graphical user interface (GUI) to a first user computing device, e.g., a smartphone, tablet, laptop computer, or other computing device. In operation 1004, the method includes receiving, into a server computer from a first user via the GUI displayed on an electronic display of the first user computing device, a computer data file carrying a representation of a human creative product of the first user. The first user may have a first user account, e.g., for access to the server computer, upload of documents, review of shared documents, sharing access to documents to a second user account, and the like. In operation 1006, the method 1000 includes receiving, from the first user via one or more entry fields of the GUI or via actuation of icons of the GUI, one or more character strings (or characters or preselected information) constituting metadata related to the human creative product. In operation 1008 the method includes encrypting the computer data file and, in operation 1010, storing the encrypted computer data file in a high capacity storage service at an addressable storage location. According to an embodiment, encrypting the computer data file, in operation 1008, may include hashing the computer data file. Operation 1012 includes encrypting the addressable storage location to form an encrypted storage location. Operation 1014 includes recording the encrypted storage location in a low or medium capacity data storage structure. In operation 1016, the method includes writing, in a database stored at a location accessible to the server computer, a database record associated with the first user account. The database record includes an addressable portion of the low or medium capacity data storage structure. In operation 1018 the method includes outputting to the GUI an indication carrying information associated with the first user account. The indication may correspond to the stored computer data file representing the human creative product.

According to an embodiment, recording the encrypted storage location in a low or medium capacity data storage structure, in operation 1014, includes recording the encrypted storage location as carried data in a blockchain transaction having a blockchain transaction identity. According to an embodiment, writing a database record associated with the first user account, in operation 1016, includes writing the database record to include the blockchain transaction identity. According to an embodiment, storing the encrypted computer data file in a high capacity storage service at an addressable storage location, in operation 1010, may include storing the encrypted computer data file in a distributed file system. Storing the encrypted computer data file in a distributed file system may include storing the encrypted computer file in an IPFS storage location.

The computer method 1000 may further include hashing the encrypted computer data file to derive a hash value. In such instance, the operation (1010) of storing the encrypted computer data file in a high capacity storage service at an addressable storage location may include storing the encrypted data file at a storage vector corresponding to the hash value. According to an embodiment, hashing the encrypted computer data file may include performing a multi-hash on the encrypted computer data file.

The computer method 1000 may further include an operation 1020 for receiving a command from the first user via the GUI to provide, to a second user having a second user account, access to the computer data file carrying a representation of a human creative product of the first user. The method 1000 may further include, in operation 1022 writing, in the database, a database record associated with the second user account. The database record may be associated with the second user account and may include data (a) to cause a second user account GUI to display an indication corresponding to the computer data file carrying the representation of the human creative product of the first user and (b) to provide second-user access to the computer data file via the second user account. The computer method 1000 may further include, in operation 1024, receiving, from the second user via the second user account GUI displayed on an electronic display of a second user computing device, a command to display the computer data file. In operation 1026, the computer method 1000 may include performing steps to display the computer data file on the electronic display of the second user computing device.

The method 1000 may also include receiving, in operation 1028, a command from the second user via the second user account GUI, where the command is to receive a new version of the computer data file including information from the second user. The new version of the computer data file may be stored, in operation 1030, in a second addressable storage location in the high capacity storage service, and recording the second addressable storage location in a second addressable portion of the low or medium capacity data storage structure. The computer method 1000 may include logging each access of the computer data file or the new version of the computer data file by the first user or the second user. Such log may be stored in and accessed via the database record associated with the first user account. The operation 1030 may further include writing database records associated with the first user account and the second user account including the second addressable portion of the low or medium capacity data storage structure and second metadata indicating that a new version of the computer data file is available.

The method 1000 may include a step 1032, wherein the first user is notified of revision of the computer data file by the second user.

According to an embodiment, downloading data defining the GUI to the first user computing device in operation 1002 may include communicating, to the first user computing device, HTML data to a browser application running on the first user computing device. Alternatively, according to an embodiment, downloading data defining the GUI to the first user computing device, in operation 1002, may include conveying, to the first user computing device, data defining an application configured to run on the first user computing device.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for providing an immutable record of human creativity, comprising:
displaying a graphical user interface (GUI) to a user including a directory screen, the directory screen separated into at least two distinct areas, wherein (i) a first area of the at least two distinct areas is configured to display different selectable objects for selecting a particular directory screen view, and (ii) a second area of the at least two distinct areas is configured to display (1) a plurality of selection objects each configured for accessing a respective corresponding secure disclosure thread and (2) an object configured for initiating a process to start a new secure disclosure thread;
receiving a user-input selection of one of the plurality of selection objects displayed in the second area of the directory screen;
receiving a cryptographic key;
decrypting, using the cryptographic key, at least a portion of the secure disclosure thread corresponding to the selected selection objects of the plurality of selection objects; and
displaying the portion of the secure disclosure thread on the graphical user interface.

2. The computer method for providing an immutable record of human creativity of claim 1, wherein said displaying the GUI to the user includes displaying a selection object, of the one or more selection objects, for accessing a respective corresponding secure disclosure thread that is established by the user.

3. The computer method for providing an immutable record of human creativity of claim 1, wherein said displaying the GUI to the user includes displaying a selection object, of the one or more selection objects, for accessing a respective corresponding secure disclosure thread that is shared with the user by a second user.

4. The computer method for providing an immutable record of human creativity of claim 1, wherein said receiving the cryptographic key includes receiving input of the cryptographic key from the user via the GUI.

5. The computer method for providing an immutable record of human creativity of claim 1, wherein receiving the cryptographic key includes obtaining the cryptographic key from a keystore provided by a medium capacity blockchain.

6. The computer method for providing an immutable record of human creativity of claim 1, wherein receiving the cryptographic key includes reading a cryptographic key held in custody and associated with a user account by a server application performing a plurality of steps of the computer method.

7. The computer method for providing an immutable record of human creativity of claim 1, further comprising:
obtaining an encrypted data location corresponding to the secure disclosure thread from a blockchain;
decrypting the data location, using the cryptographic key; and
accessing data corresponding to the secure disclosure thread at the data location.

8. The computer method for providing an immutable record of human creativity of claim 7, wherein said obtaining an encrypted data location corresponding to the secure disclosure thread from a blockchain includes retrieving the encrypted data location from a medium capacity blockchain.

9. The computer method for providing an immutable record of human creativity of claim 8, wherein the data location is addressed as an address in a high capacity blockchain or a distributed storage system.

10. The computer method for providing an immutable record of human creativity of claim 8, wherein the data location is a multi-hash in a distributed file system.

11. The computer method for providing an immutable record of human creativity of claim 10, wherein the distributed file system includes IPFS.

12. A computer method for establishing a securely stored disclosure, comprising:
displaying, on an electronic display of a first user computing device, a graphical user interface (GUI) to a user including a directory screen, the directory screen separated into at least two distinct areas, wherein (i) a first area of the at least two distinct areas is configured to display different selectable objects for selecting a particular directory screen view, and (ii) a second area of the at least two distinct areas is configured to display (1) a plurality of selection objects each configured for accessing a respective corresponding secure disclosure thread and (2) an object configured for initiating a process to start a new secure disclosure thread;
receiving a user-input selection of the object displayed in the second area of the directory screen configured for initiating the process to start the new secure disclosure thread;
receiving, into a server computer from a first user via the GUI displayed on the electronic display of the first user computing device, a computer data file carrying a representation of a human creative product of the first user, the first user having a first user account;
receiving, from the first user via one or more entry fields of the GUI or via actuation of icons of the GUI, one or more character strings constituting metadata related to the human creative product;
encrypting the computer data file;
storing the encrypted computer data file in a high capacity storage service at an addressable storage location;
encrypting the addressable storage location to form an encrypted storage location;
recording the encrypted storage location in a low or medium capacity data storage structure;
writing, in a database, a database record associated with the first user account, the database record including an addressable portion of the low or medium capacity data storage structure; and
outputting to the GUI an icon carrying information associated with the first user account, the icon corresponding to the stored computer data file representing the human creative product.

13. The computer method of claim 12, wherein recording the encrypted storage location in a low or medium capacity data storage structure includes recording the encrypted storage location as carried data in a blockchain transaction having a blockchain transaction identity.

14. The computer method of claim 13, wherein writing a database record associated with the first user account includes writing the database record to include the blockchain transaction identity.

15. The computer method of claim 12, wherein storing the encrypted computer data file in a high capacity storage service at an addressable storage location includes storing the encrypted computer data file in a distributed file system.

16. The computer method of claim 15, wherein storing the encrypted computer data file in the distributed file system includes storing the encrypted computer file in an IPFS storage location.

17. The computer method of claim 12, further comprising:
hashing the encrypted computer data file to derive a hash value;
wherein storing the encrypted computer data file in a high capacity storage service at an addressable storage location includes storing the encrypted data file at a storage vector corresponding to the hash value.

18. The computer method of claim 17, wherein hashing the encrypted computer data file includes performing a multi-hash on the encrypted computer data file.

19. The computer method of claim 12, wherein encrypting the computer data file includes hashing the computer data file.

20. The computer method of claim 12, further comprising:
receiving a command from the first user via the GUI to provide, to a second user having a second user account, access to the computer data file carrying a representation of a human creative product of the first user;
writing, in the database, a database record associated with the second user account, the database record associated with the second user account including data to cause a second user account GUI to display an indication corresponding to the computer data file carrying the representation of the human creative product of the first user and to provide access to the computer data file by the second user via the second user account.

21. The computer method of claim 20, further comprising:
receiving, from the second user via the second user account GUI displayed on an electronic display of a second user computing device, a command to display the computer data file; and
performing steps to display the computer data file on the electronic display of the second user computing device.

22. The computer method of claim 21, further comprising:
receiving a command from the second user via the second user account GUI to receive a new version of the computer data file including information from the second user;

storing the new version of the computer data file in a second addressable storage location in the high capacity storage service, recording the second addressable storage location in a second addressable portion of the low or medium capacity data storage structure, and writing database records associated with the first user account and the second user account including the second addressable portion of the low or medium capacity data storage structure and second metadata indicating that a new version of the computer data file is available.

23. The computer method of claim 12, further comprising: downloading data defining the GUI to the first user computing device.

24. The computer method of claim 23, wherein downloading data defining the GUI to the first user computing device includes downloading HTML, data to a browser application running on the first user computing device.

25. The computer method of claim 23, wherein downloading data defining the GUI to the first user computing device includes downloading data defining an application configured to run on the first user computing device.

26. The computer method of claim 22, further comprising: logging, in the database record associated with the first user account, each access of the computer data file or the new version of the computer data file by the first user or the second user.

* * * * *